US009980018B2

United States Patent
Wong et al.

(10) Patent No.: US 9,980,018 B2
(45) Date of Patent: May 22, 2018

(54) COMMUNICATION DEVICE WITH NARROW-GROUND-CLEARANCE ANTENNA ELEMENT

(71) Applicant: Acer Incorporated, New Taipei (TW)

(72) Inventors: Kin-Lu Wong, New Taipei (TW); Hsuan-Jui Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 94 days.

(21) Appl. No.: 15/137,712

(22) Filed: Apr. 25, 2016

(65) Prior Publication Data

US 2017/0264975 A1 Sep. 14, 2017

(30) Foreign Application Priority Data

Mar. 11, 2016 (TW) .............................. 105107612 A (51) Int. Cl.
*H01Q 1/24* (2006.01)
*H01Q 5/00* (2015.01)
*H04Q 1/48* (2006.01)
*H01Q 5/328* (2015.01)
*H01Q 5/385* (2015.01)

(52) U.S. Cl.
CPC .............. *H04Q 1/48* (2013.01); *H01Q 1/243* (2013.01); *H01Q 5/328* (2015.01); *H01Q 5/385* (2015.01)

(58) Field of Classification Search
CPC ........ H01Q 1/241; H01Q 1/242; H01Q 1/243; H01Q 5/307; H01Q 5/314; H01Q 5/328; H01Q 5/357; H01Q 5/364; H01Q 9/30; H01Q 7/00
See application file for complete search history.

(56) References Cited

U.S. PATENT DOCUMENTS

| 5,184,143 | A | 2/1993 | Marko | |
|---|---|---|---|---|
| 7,375,691 | B1* | 5/2008 | Chiang | H01Q 1/243 343/700 MS |
| 7,425,924 | B2* | 9/2008 | Chung | H01Q 1/38 343/702 |
| 8,228,244 | B2* | 7/2012 | Wong | H01Q 1/24 343/700 MS |
| 8,648,752 | B2* | 2/2014 | Ramachandran | H01Q 1/24 343/700 MS |

(Continued)

FOREIGN PATENT DOCUMENTS

TW 201114101 4/2011

*Primary Examiner* — Tho G Phan
*Assistant Examiner* — Patrick Holecek
(74) *Attorney, Agent, or Firm* — J.C. Patents (57) ABSTRACT

A communication device including a system circuit board and an antenna element is presented. A radiation metal strip of the antenna element does not lie on the same surface as the system circuit board. The radiation metal strip and a ground plane are separated by a clearance region. The radiation metal strip comprises a first metal strip, a second metal strip, and a coupling metal strip. A first end is located in the first metal strip and connected to the ground plane by a first inductive element. A second end is located in the second metal strip and connected to the ground plane by a second inductive element. A first gap is located between the coupling metal strip and the first metal strip. A second gap is located between the coupling metal strip and the second metal strip. The coupling metal strip is connected to a signal source.

11 Claims, 4 Drawing Sheets

(56) References Cited

U.S. PATENT DOCUMENTS

| | | | |
|---|---|---|---|
| 9,190,733 B2 * | 11/2015 | Desclos | H01Q 7/005 |
| 9,722,325 B2 * | 8/2017 | Svendsen | H01Q 21/28 |
| 2007/0285321 A1 | 12/2007 | Chung et al. | |
| 2015/0236417 A1 | 8/2015 | Iellci | |

* cited by examiner

COMMUNICATION DEVICE WITH NARROW-GROUND-CLEARANCE ANTENNA ELEMENT

CROSS-REFERENCE TO RELATED APPLICATION

This application claims the priority benefit of Taiwan application serial no. 105107612, filed on Mar. 11, 2016. The entirety of the above-mentioned patent application is hereby incorporated by reference herein and made a part of this specification.

BACKGROUND OF THE INVENTION

Field of the Invention

The invention relates to a communication device, specifically to a communication device having a narrow ground plane clearance region antenna element.

Description of Related Art

Along with the rapid development of mobile communication technology, a variety of mobile communication products have been continuously introduced, wherein the communication device (such as smart phone, tablet PC, etc.) is the most popular. In view of these communication devices, one of the trends is becoming thin in appearance. Nowadays, appearance design and solidity of the communication device is becoming more and more important. Therefore, how to design a communication device having a metal case and a thin appearance and an antenna element applicable to the communication device, for example, the antenna element is designed to has a wide-band or multi-band characteristic and simultaneously the metal case only needs a narrow metal clearance region disposed at a frame of the metal case (e.g., the width of the metal clearance region is smaller than or greatly smaller than 4 mm), such that the communication device has a beautiful and thin appearance, has become a major issue.

SUMMARY OF THE INVENTION

The invention provides a communication device that includes an antenna element having a narrow ground plane clearance region, such that a metal case of the communication device only needs a narrow metal clearance region adjacent to a frame of the metal case and configured to serve as an antenna window, so as to achieve a beautiful appearance and solidity of the communication device having the metal case.

A communication device of the invention includes a system circuit board and an antenna element. The system circuit board has a ground plane. The antenna element includes a radiation metal strip. The radiation metal strip and the system circuit board do not lie on the same surface. The radiation metal strip is extended along a first edge of the system circuit board, and the radiation metal strip and the ground plane are separated by a clearance region. The clearance region has a width, and the ground plane is not disposed in the clearance region. The radiation metal strip has a first end and a second end, and the distance between the first end and the second end is the length of the radiation metal strip. The radiation metal strip includes a first metal strip, a second metal strip, and a coupling metal strip. The first end is located in the first metal strip and electrically connected to the ground plane by a first inductive element. The second end is located in the second metal strip and electrically connected to the ground plane by a second inductive element. The coupling metal strip is located between the first metal strip and the second metal strip, and located on the same plane with the first metal strip and the second metal strip. A first gap is located between the coupling metal strip and the first metal strip, a second gap is located between the coupling metal strip and the second metal strip, and the coupling metal strip has an antenna feed point. The antenna feed point is electrically connected to a signal source located on the system circuit board by a feed metal line. The distance between the first gap and the antenna feed point is not greater than the width of the clearance region, and the distance between the second gap and the antenna feed point is also not greater than the width of the clearance region.

In one embodiment of the invention, the feed metal line, the coupling metal strip, the first gap, the first metal strip, and the first inductive element form a first closed path, and the first closed path generates a first resonant mode in a first band of the antenna element.

In one embodiment of the invention, the feed metal line, the coupling metal strip, the second gap, the second metal strip, and the second inductive element form a second closed path, and the second closed path generates a second resonant mode in a second band of the antenna element.

In one embodiment of the invention, the radiation metal strip of the antenna element is extended along a first edge of the system circuit board, and the first edge is a short edge of the communication device.

In one embodiment of the invention, the feed metal line of the antenna element is located at the clearance region, and the feed metal line has a straight line shape, a stepped shape, or a multi-curved shape, or has a third inductive element. Each of the first inductive element, the second inductive element, and the third inductive element is a chip inductive element or a distributed inductive element. The feed metal line of the antenna element is further electrically connected to the signal source by a matching circuit.

In order to make the aforementioned and other features and advantages of the invention more comprehensible, embodiments accompanying figures are described in detail bellows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
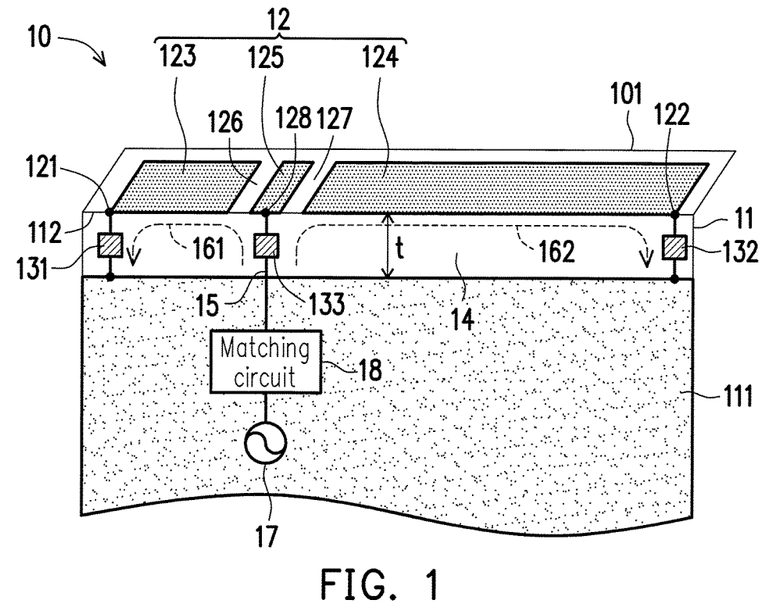
FIG. 1 is a structural diagram of the first embodiment of the communication device in the invention.

FIG. 1 is a structural diagram of the first embodiment of the communication device in the invention. As shown in FIG. 1, the communication device 10 may be a device having a metal case, such as smart phone or tablet PC, etc., and the communication device 10 includes a system circuit board 11. The system circuit board 11 has a ground plane 111 and an antenna element. The antenna element includes a radiation metal strip 12, and the radiation metal strip 12 and the system circuit board 11 do not lie on the same surface. The radiation metal strip 12 is extended along a first edge 112 of the system circuit board 11. The radiation metal strip 12 and the ground plane 111 are separated by a clearance region 14, and the ground plane 111 is not disposed in the clearance region 14. In other words, the ground plane 111 and the clearance region 14 are disposed on a surface of the system circuit board 11, and the clearance region 14 is located between the radiation metal strip 12 and the ground plane 111.

The radiation metal strip 12 has a first end 121 and a second end 122. The distance between the first end 121 and the second end 122 is the length of the radiation metal strip 12. The radiation metal strip 12 includes a first metal strip 123, a second metal strip 124, and a coupling metal strip 125. The first end 121 is located in the first metal strip 123, and the first end 121 is electrically connected to the ground plane 111 by a first inductive element 131. The second end 122 is located in the second metal strip 124, and the second end 122 is electrically connected to the ground plane 111 by a second inductive element 132.

The coupling metal strip 125 is located between the first metal strip 123 and the second metal strip 124, and the coupling metal strip 125, the first metal strip 123, and the second metal strip 124 are located on the same plane. A first gap 126 is located between the coupling metal strip 125 and the first metal strip 123. A second gap 127 is located between the coupling metal strip 125 and the second metal strip 124. The coupling metal strip 125 has an antenna feed point 128. The antenna feed point 128 is electrically connected to a signal source 17 located on the system circuit board 11 by a feed metal line 15, and the signal source 17 may be a transceiver (not shown) in the communication device 10, for example.

The communication device 10 further includes a frame 101. The frame 101 surrounds the system circuit board 11, and FIG. 1 only depicts a part of the frame 101 for convenience of explanation. In an embodiment, the frame 101 may be made of a non-conductive material. In other words, the communication device 10 may further include a non-metallic frame 101, and the first metal strip 123, the second metal strip 124, and the coupling metal strip 125 may be disposed on a surface of the non-metallic frame 101, for example. In another embodiment, the frame 101 may also be made of a conductive material. For example, a part of the frame 101 may be formed by the first metal strip 123, the second metal strip 124, and the coupling metal strip 125.

In operation, the feed metal line 15, the coupling metal strip 125, the first gap 126, the first metal strip 123, and the first inductive element 131 may form a first closed path 161. In addition, the antenna element may generate a first resonant mode through the first closed path 161, and the first resonant mode is in a first band (such as the high frequency band) of the antenna element. To be more specific, the feed signal from the signal source 17 is transmitted to the coupling metal strip 125 by the feed metal line 15. In addition, the feed signal may be capacitively coupled to the first metal strip 123 from the coupling metal strip 125 through the first gap 126. In other words, through the coupling metal strip 125 and the first gap 126, the first closed path 161 form a loop resonant path with a capacitively coupled feed, so as to make the length of the first closed path 161 smaller than a quarter wavelength of a lowest frequency in the first band (such as the high frequency band). Moreover, the first inductive element 131 is configured to increase an equivalent resonant length of the first closed path 161.

In other words, the first inductive element 131 and the coupled feed formed by the first gap 126 may greatly reduce the physical length of the first closed path 161, so as to facilitate reducing the size of the antenna element. For example, the length of the first metal strip 123 may be equal to 0.1 times the wavelength of the lowest frequency in the first band (such as the high frequency band). Furthermore, the capacitive reactance of the parasitic capacitor between the coupling metal strip 125 and the first metal strip 123 may also compensate the inductive reactance of the first inductive element 131. Accordingly, the impedance matching of the first resonant mode of the antenna element is smoother, or the first resonant mode has a dual resonant characteristic, so as to contribute to increase the bandwidth of the first band (such as the high frequency band) of the antenna element.

On the other hand, the feed metal line 15, the coupling metal strip 125, the second gap 127, the second metal strip 124, and the second inductive element 132 may form a second closed path 162. In addition, the antenna element may generate a second resonant mode through the second closed path 162, and the second resonant mode is in a second band (such as the low frequency band) of the antenna element. To be more specific, the feed signal from the signal source 17 is transmitted to the coupling metal strip 125 by the feed metal line 15. Moreover, the feed signal may be capacitively coupled to the second metal strip 124 from the coupling metal strip 125 through the second gap 127. In other words, the second closed path 162 may form another loop resonant path with the capacitively coupled feed, so as to make the length of the second closed path 162 smaller than a quarter wavelength of a lowest frequency in the second band (such as the low frequency band). Moreover, the second inductive element 132 is configured to increase an equivalent resonant length of the second closed path 162.

In other words, the second inductive element 132 and the coupled feed formed by the second gap 127 may greatly reduce the physical length of the second closed path 162, so as to facilitate reducing the size of the antenna element. For example, the length of the second metal strip 124 may be equal to 0.13 times the wavelength of the lowest frequency in the second band (such as the low frequency band). Furthermore, the capacitive reactance of the parasitic capacitor between the coupling metal strip 125 and the second metal strip 124 may also compensate the inductive reactance of the second inductive element 132. Accordingly, the impedance matching of the second resonant mode of the antenna element is smoother, or the second resonant mode has a dual resonant characteristic, so as to contribute to increase the bandwidth of the second band (such as the low frequency band) of the antenna element.

Generally, the antenna element is equivalent to a loop antenna excited through coupling, and the loop antenna includes a dual loop resonant path to operate in the first band (such as the high frequency band) and in the second band (such as the low frequency band). Moreover, in the overall configuration, the clearance region 14 has a width t, and the width t is from 0.5 mm to 4 mm. In other words, the communication device 10 has a narrow clearance region 14 (such as a narrow ground plane clearance region) adjacent to the frame 101, such that the metal case of the communication device 10 has a narrow metal clearance region serving as an antenna window of the antenna element. The width t of the clearance region 14 is at least equal to 0.5 mm, thereby separating the radiation metal strip 12 and the ground plane 111. In addition, the width t of the clearance region 14 is at most equal to 4.0 mm, thereby maintaining the beauty of the overall appearance of the communication device 10.

It is worth mentioning that, the coupling metal strip 125 is mainly configured to electrically connect the antenna feed point 128 to the feed metal line 15. Therefore, the length of the coupling metal strip 125 only constitutes a small part of the total length of the antenna element. In contrast, the distance between the first gap 126 and the antenna feed point 128 is not greater than the width of the clearance region 14, and the distance between the second gap 127 and the antenna feed point 128 is also not greater than the width of the clearance region 14.

Otherwise, through the coupled feed, the first inductive element 131 and the second inductive element 132 may greatly reduce the size of the radiation metal strip 12, thus the radiation metal strip 12 may be disposed on a short edge of the communication device 10 (such as a smart phone) and may not need to occupy the long edge of the communication device 10. That is, the first edge 112 of the communication device 10 may be a short edge of the communication device 10, for example. Furthermore, each of the two ends 121 and 122 of the radiation metal strip 12 is electrically connected to the ground plane 111 by an inductive element. In other words, open ends of the radiation metal strip 12 are not formed adjacent to the corners at the two ends of the first edge 112. Accordingly, the phenomenon that the efficiency of antenna element is affected when the user holds the communication device 10 is greatly reduced.

Furthermore, the feed metal line 15 of the antenna element is located at the clearance region 14, and the feed metal line may have a straight line shape or have a third inductive element 133. The feed metal line 15 may be further electrically connected to the signal source 17 by a matching circuit 18. The matching circuit 18 may improve the impedance matching of the antenna element in the first band and the second band, so as to further increase the operating bandwidth of the antenna element. In addition, each of the first inductive element 131, the second inductive element 132, and the third inductive element 133 may be a chip inductive element or a distributed inductive element.

Figure 2:
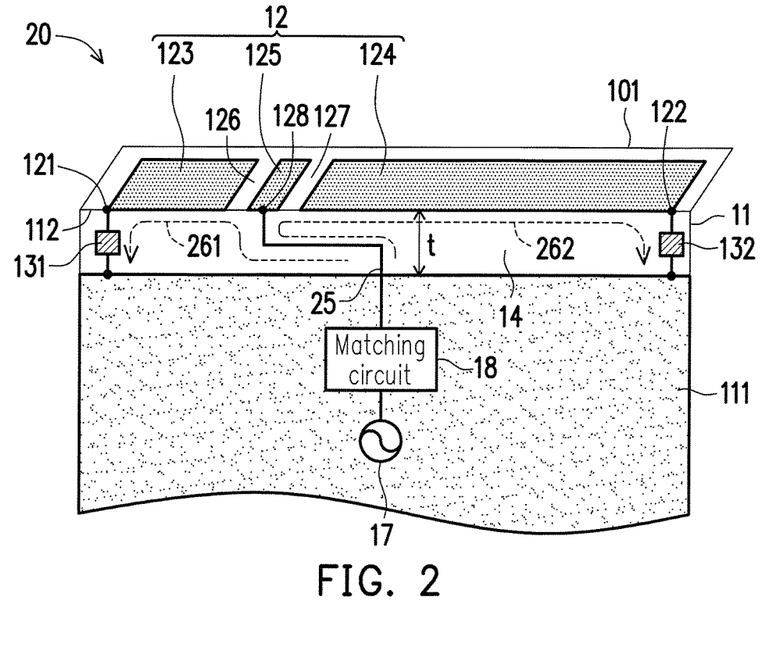
FIG. 2 is a structural diagram of the second embodiment of the communication device in the invention.

FIG. 2 is a structural diagram of the second embodiment of the communication device in the invention. In comparison with the embodiment in FIG. 1, the feed metal line 25 of the communication device 20 in FIG. 2 has a stepped shape, the feed metal line 25 having the stepped shape is extended toward the second metal strip 124, such that the length of the feed metal line 25 in the narrow clearance region 14 is increased. Along with the length increment of the feed metal line 25, equivalent resonant lengths of a first closed path 261 and a second closed path 262 may be increased, such that the frequencies of the corresponding generated first resonant mode and second resonant mode is reduced. As a result, the target of reducing the size of the antenna element is achieved, and simultaneously the flexibility in design is also enhanced. The detailed structure of other elements of the embodiment in FIG. 2 is the same as or similar to the detailed structure of the corresponding elements of the embodiment in FIG. 1, and with the similar structures, the communication device 20 in the second embodiment in FIG. 2 may has a similar performance to the first embodiment in FIG. 1.

Figure 3:
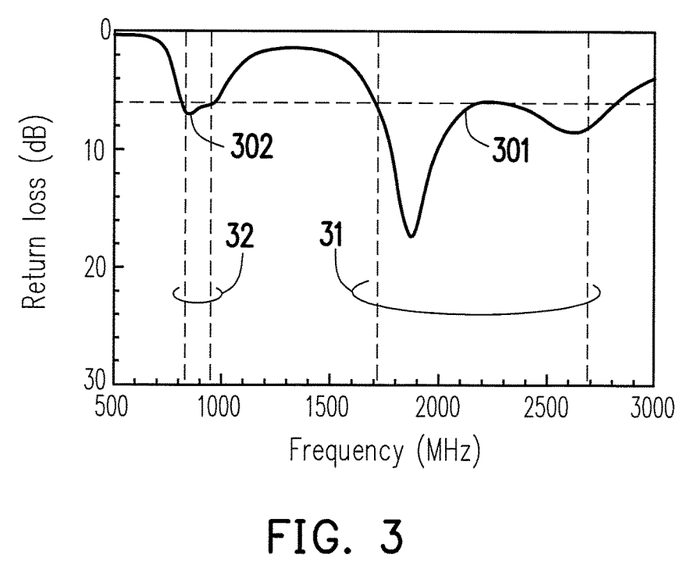
FIG. 3 is a graph illustrating a return loss of an antenna element in the second embodiment of the invention.

FIG. 3 is a graph illustrating a return loss of an antenna element in the second embodiment of the invention. In the second embodiment, the length of the system circuit board 11 may be 133 mm, and the width of the system circuit board 11 may be 70 mm. The length of the ground plane 111 may be 130 mm, and the width of the ground plane 111 may be 70 mm. The length of the first metal strip 123 may be 16.5 mm, the length of the second metal strip 124 may be 48.5 mm, and the size of the coupling metal strip 125 may be 3×6 mm$^2$. The first inductive element 131 may use a 1.5 nH chip inductive element, and the second inductive element 132 may use a 2.4 nH chip inductive element. In this configuration, the width t of the clearance region 14 is only 3 mm.

As shown in FIG. 3, a resonant mode 301 is the first resonant mode generated by the first closed path 261, and the resonant mode 301 is in the first band 31. In addition, a resonant mode 302 is the second resonant mode generated by the second closed path 262, and the resonant mode 302 is in the second band 32. Furthermore, the first band 31 may cover about 1710~2690 MHz and may also cover the related operating band of LTE and WWAN. The second band 32 may cover about 824~960 MHz and may also cover the bands of GSM850, GSM900, and LTE band5/band8.

Figure 4:
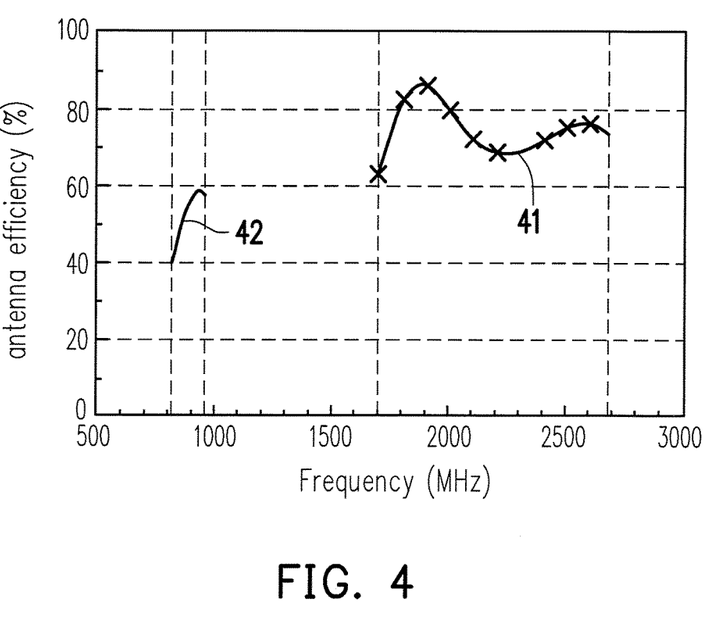
FIG. 4 is a graph illustrating an antenna efficiency of the antenna element in the second embodiment of the invention.

FIG. 4 is a graph illustrating an antenna efficiency of the antenna element in the second embodiment of the invention. As shown in FIG. 4, an antenna efficiency curve 41 in the first band 31 is from 62% to 88%, and an antenna efficiency curve 42 in the second band 32 is from 40% to 59%. In other words, the antenna element is applicable to the real mobile communication device.

Figure 5:
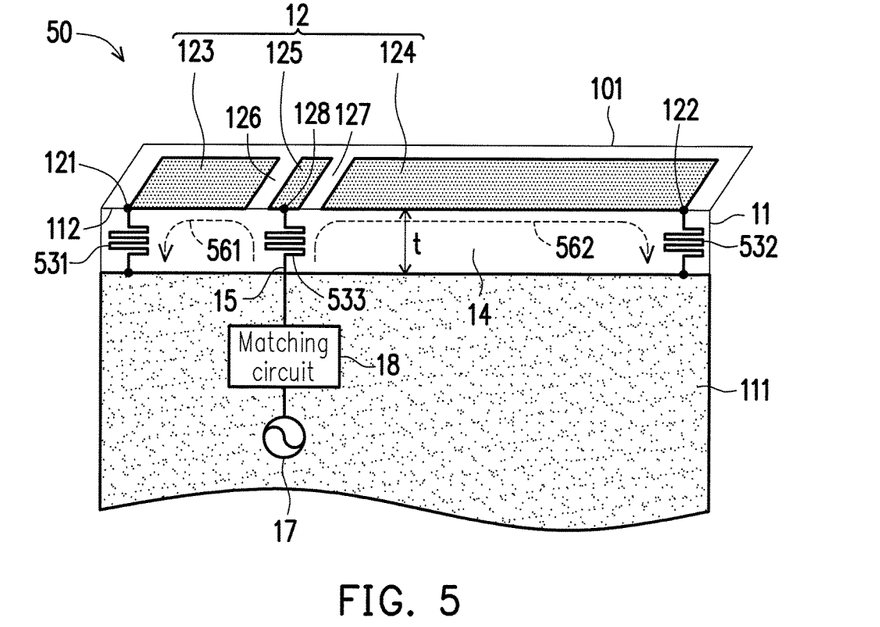
FIG. 5 is a structural diagram of the third embodiment of the communication device in the invention.

FIG. 5 is a structural diagram of the third embodiment of the communication device in the invention. In comparison with the embodiment in FIG. 1, each of a first inductive element 531, a second inductive element 532 and a third inductive element 533 of the communication device 50 in FIG. 5 may be a distributed inductive element, and the distributed inductive element may be formed by a metal line having a curved shape. Accordingly, the equivalent resonant length of a first closed path 561 and a second closed path 562 may be increased, the target of reducing the size of the antenna element is achieved, and the flexibility in design is enhanced. The detailed structure of other elements of the embodiment in FIG. 5 is the same as or similar to the detailed structure of the corresponding elements of the embodiment in FIG. 1, and with the similar structures, the communication device 50 in the second embodiment in FIG. 5 may have a similar performance to the first embodiment in FIG. 1.

Figure 6:
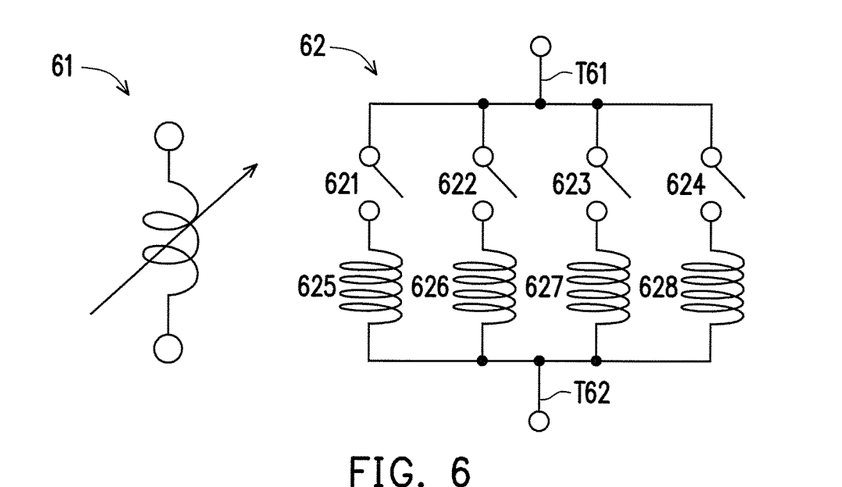
FIG. 6 is a structural diagram of other embodiments of a first inductive element and a second inductive element in the invention.

FIG. 6 is a structural diagram of other embodiments of the first inductive element and the second inductive element in the invention. As shown in FIG. 6, each of the first inductive element 131 and the second inductive element 132 may be an adjustable inductive element 61 or a group of inductive elements 62. The group of inductive elements 62 includes a plurality of switches 621~624 and a plurality of inductors 625~628. The switches 621~624 and the inductors 625~628 are in one-to-one correspondence, and each of the switches and the corresponding inductor are connected in series between the connecting terminals T61 and T61. In one embodiment, the communication device may change the inductance values of the first inductive element 131 and the second inductive element 132 via an adjustable circuit or a switching circuit. For example, the adjustable circuit or the switching circuit may use a control signal to directly control the adjustable inductive element 61, or may use the control signal to control the number of the turned-on switches in the switches 621~624 of the group of inductive elements 62. Accordingly, the equivalent resonant lengths of the first closed path and the second closed path are correspondingly changed, so as to change the frequencies of the first resonant mode and the second resonant mode, such that the first band 31 and the second band 32 of the antenna element may cover different frequency ranges.

Figure 7:
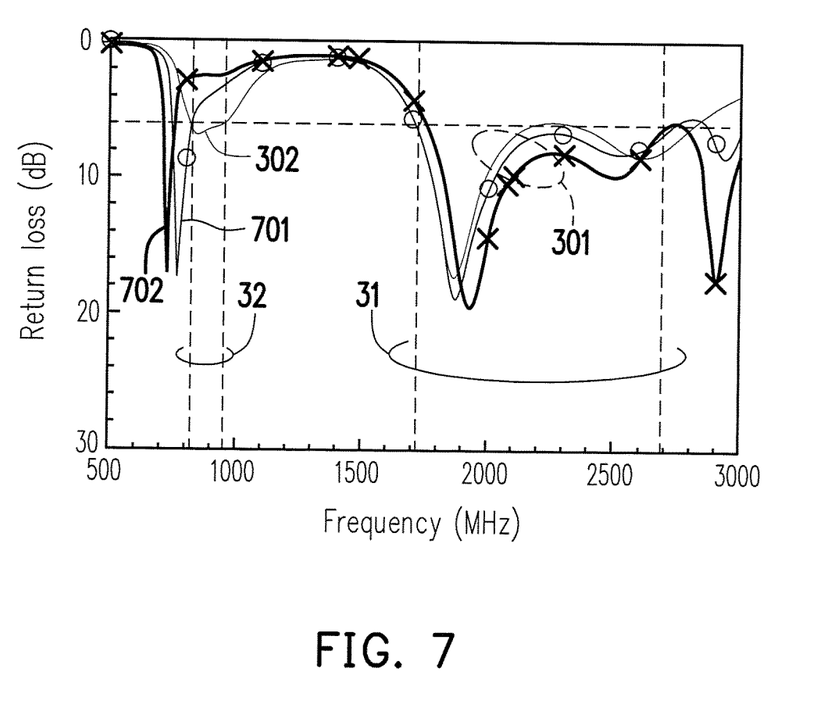
FIG. 7 is a graph illustrating another return loss of the antenna element in the second embodiment of the invention.

FIG. 7 is a graph illustrating another return loss of the antenna element in the second embodiment of the invention, wherein the second inductive element 132 is formed by the group of switchable inductive elements 62. To be more specific, the switching circuit may change the number of the turned-on switches in the switches 621~624, so as to adjust the inductance value of the second inductive element 132. Accordingly, the resonant length of the second closed path is changed, so as to change the frequency of the second resonant mode. For example, when the inductance value of the second inductive element 132 is adjusted to 5.6 nH, the antenna element may generate a resonant mode 701 by the second closed path, and the resonant mode 701 may cover about 746~787 MHz. When the inductance value of the second inductive element 132 is adjusted to 8.2 nH, the antenna element may generate a resonant mode 702 by the second closed path, and the resonant mode 702 may cover about 698~746 MHz. Accordingly, the antenna element may further cover more of operating bands of LTE (such as LTE band12/band13).

That is, via the controlling of the adjustable circuit or the switching circuit, the position of the second band of the antenna element may be adjusted, such that the antenna element may cover a wider operating bandwidth. For example, the second band of the antenna element may cover about 824~960 MHz when the passive inductive element is used. By the controlling of the adjustable circuit or the switching circuit, the second band of the antenna element may cover about 700~824 MHz. Accordingly, the frequency range of the second band of the antenna element may cover about 698~960 MHz. At the same time, the first band of the antenna element may still cover 1710~2690 MHz. Namely, in one embodiment, the antenna element may cover the frequency bands of 824~960 MHz/1710~2690 MHz or the frequency bands of 698~960 MHz/1710~2690 MHz under the LTE/WLAN communication standard.

In summary, the coupled feed structure of the antenna element and the inductive short circuit structure at two ends of the antenna element in the invention may greatly reduce the size of the radiation metal strip, such that the radiation metal strip may be disposed on the frame adjacent to the short edge of the communication device. Moreover, the communication device has a narrow clearance region (such as a narrow ground plane clearance region) adjacent to the frame. Accordingly, the metal case of the communication device only needs the narrow metal clearance region adjacent to the frame and configured to serve as the antenna window, so as to maintain the solidity and the beauty of the overall appearance of the communication device.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. A communication device, the communication device comprising a system circuit board and an antenna element, the system circuit board having a ground plane, the antenna element comprising a radiation metal strip, the radiation metal strip and the system circuit board not lying on a same surface, the radiation metal strip being extended along a first edge of the system circuit board, the radiation metal strip and the ground plane being separated by a clearance region, the clearance region having a width, the ground plane not being disposed in the clearance region, the radiation metal strip having a first end and a second end, a distance between the first end and the second end is a length of the radiation metal strip, the radiation metal strip comprising:
   a first metal strip, having the first end, wherein the first end is electrically connected to the ground plane by a first inductive element;
   a second metal strip, having the second end, wherein the second end is electrically connected to the ground plane by a second inductive element; and
   a coupling metal strip, located between the first metal strip and the second metal strip, and located on a same plane with the first metal strip and the second metal strip, a first gap being located between the coupling metal strip and the first metal strip, a second gap being located between the coupling metal strip and the second metal strip, the coupling metal strip having an antenna feed point, the antenna feed point being electrically connected to a signal source located on the system circuit board by a feed metal line, wherein a distance between the first gap and the antenna feed point is not greater than the width of the clearance region, a distance between the second gap and the antenna feed point is also not greater than the width of the clearance region, and the width of the clearance region is from 0.5 mm to 4.0 mm.

2. The communication device as recited in claim 1, wherein the first metal strip, the second metal strip, and the coupling metal strip are formed on a surface of a frame of the communication device.

3. The communication device as recited in claim 1, wherein the feed metal line, the coupling metal strip, the first gap, the first metal strip, and the first inductive element form a first closed path, the first closed path generates a first resonant mode, and the first resonant mode is in a first band of the antenna element.

4. The communication device as recited in claim 1, wherein the feed metal line, the coupling metal strip, the second gap, the second metal strip, and the second inductive element form a second closed path, the second closed path generates a second resonant mode, and the second resonant mode is in a second band of the antenna element.

5. The communication device as recited in claim 1, wherein the first edge is a short edge of the communication device.

6. The communication device as recited in claim 1, wherein the feed metal line is located at the clearance region, and the feed metal line has a straight line shape, a stepped shape, or a multi-curved shape, or has a third inductive element.

7. The communication device as recited in claim 6, wherein the feed metal line having the stepped shape is extended toward the second metal strip, and a length of the second metal strip is greater than a length of the first metal strip.

8. The communication device as recited in claim 6, wherein each of the first inductive element, the second inductive element, and the third inductive element is a chip inductive element or a distributed inductive element.

9. The communication device as recited in claim 1, wherein the feed metal line is further electrically coupled to the signal source by a matching circuit.

10. The communication device as recited in claim 1, wherein each of the first inductive element and the second inductive element is a chip inductive element or a distributed inductive element.

11. The communication device as recited in claim 1, wherein the second inductive element is an adjustable inductive element or a group of inductive elements, the communication device changes inductance value of the second inductive element by an adjustable circuit or a switching circuit, such that the second band of the antenna element covers different frequency ranges.

\* \* \* \* \*